United States Patent [19]

Sawada et al.

[11] Patent Number: 5,592,662
[45] Date of Patent: Jan. 7, 1997

[54] FILE MANAGEMENT SYSTEM AND METHOD FOR MANAGING ACCESS AND STORAGE OF DATA WITHIN MULTIPLE EXTERNAL MEMORY DEVICES

[75] Inventors: Takaaki Sawada, Sagamihara; Masahiko Yoshimura; Seiji Yoshida, both of Yokohama, all of Japan

[73] Assignee: Kabushiki Kaisha Tishiba, Kawasaki, Japan

[21] Appl. No.: 128,219

[22] Filed: Sep. 29, 1993

[30] Foreign Application Priority Data

Sep. 30, 1992 [JP] Japan .................................... 4-262118

[51] Int. Cl.⁶ ............................. G06F 7/00; G06F 13/00
[52] U.S. Cl. ........................ 395/601; 395/621; 395/625
[58] Field of Search ..................................... 395/600, 650, 395/900, 575, 425

[56] References Cited

U.S. PATENT DOCUMENTS

| | | | |
|---|---|---|---|
| 4,924,426 | 5/1990 | Kameda et al. | 364/900 |
| 5,053,945 | 10/1991 | Whisler | 364/200 |
| 5,107,481 | 4/1992 | Miki et al. | 369/59 |
| 5,113,519 | 5/1992 | Johnson et al. | 395/600 |
| 5,185,887 | 2/1993 | Takahashi et al. | 395/600 |
| 5,212,786 | 5/1993 | Sathi | 395/600 |
| 5,276,830 | 1/1994 | Endo et al. | 395/425 |
| 5,276,850 | 1/1994 | Sakaue | 395/425 |
| 5,313,617 | 5/1994 | Nakano et al. | 395/500 |
| 5,339,400 | 8/1994 | Iijima | 395/425 |
| 5,357,607 | 10/1994 | Sathi et al. | 395/600 |
| 5,408,630 | 4/1995 | Moss | 395/425 |

*Primary Examiner*—Thomas G. Black
*Assistant Examiner*—C. Pham
*Attorney, Agent, or Firm*— Cushman, Darby & Cushman

[57] ABSTRACT

Unique data block identifiers are assigned to the entire data block group of plural external memory devices. The file management information stores, in a table format, the unique data block identifiers in connection with a file held in the data block group. When a file management process is executed in accordance with the operation type (access, addition, registration, deletion) of file management, the file management information is referred to. Furthermore, a data block group management process is called and the operation is performed. When a data block shift process is executed, the data block group management process is called and the contents of the data block are shifted between external memory device based on the file management information. When the file management process or the data block shift process is executed, data stored in the file management information is rewritten on an as-needed basis.

23 Claims, 13 Drawing Sheets

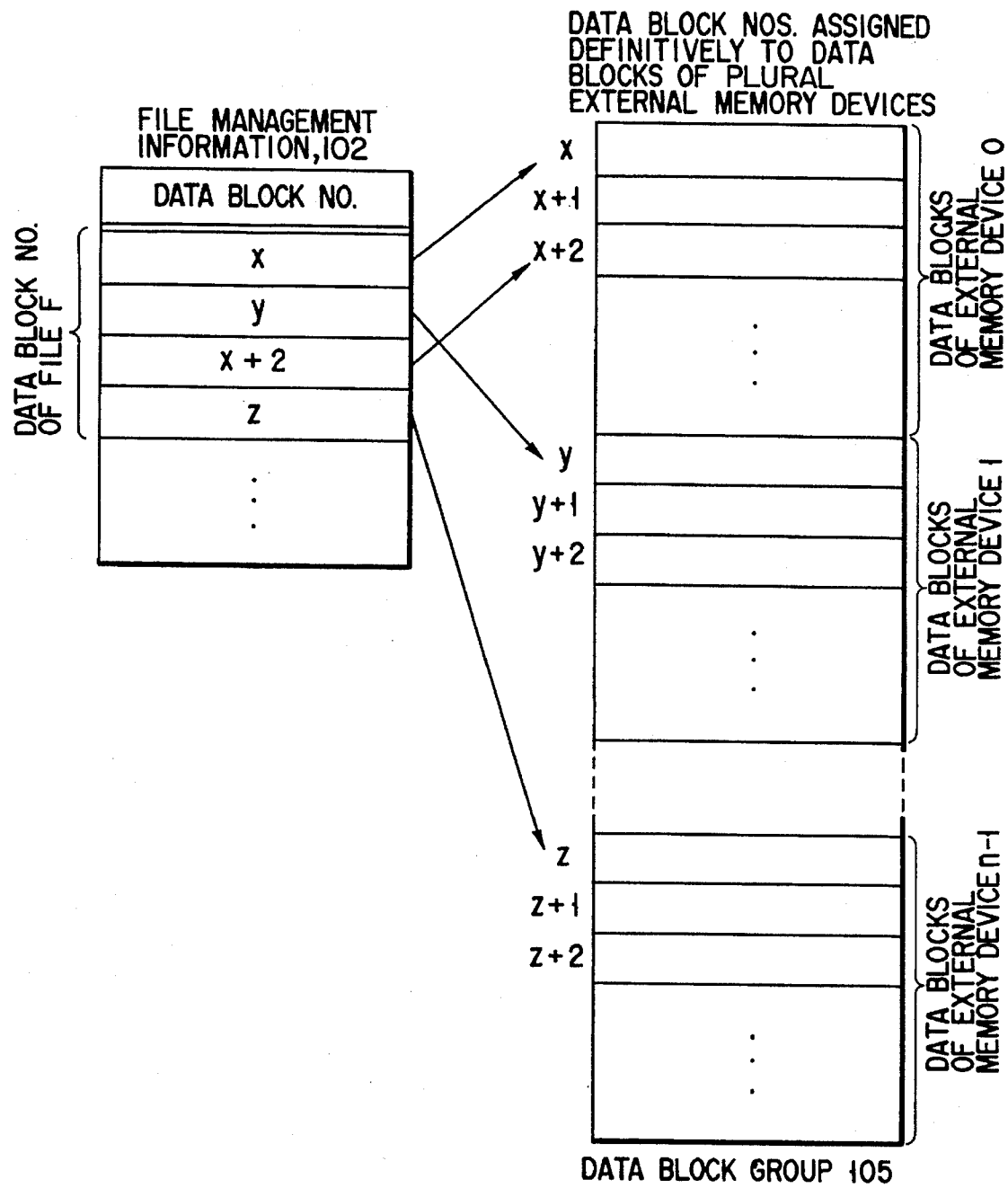
F I G. 3

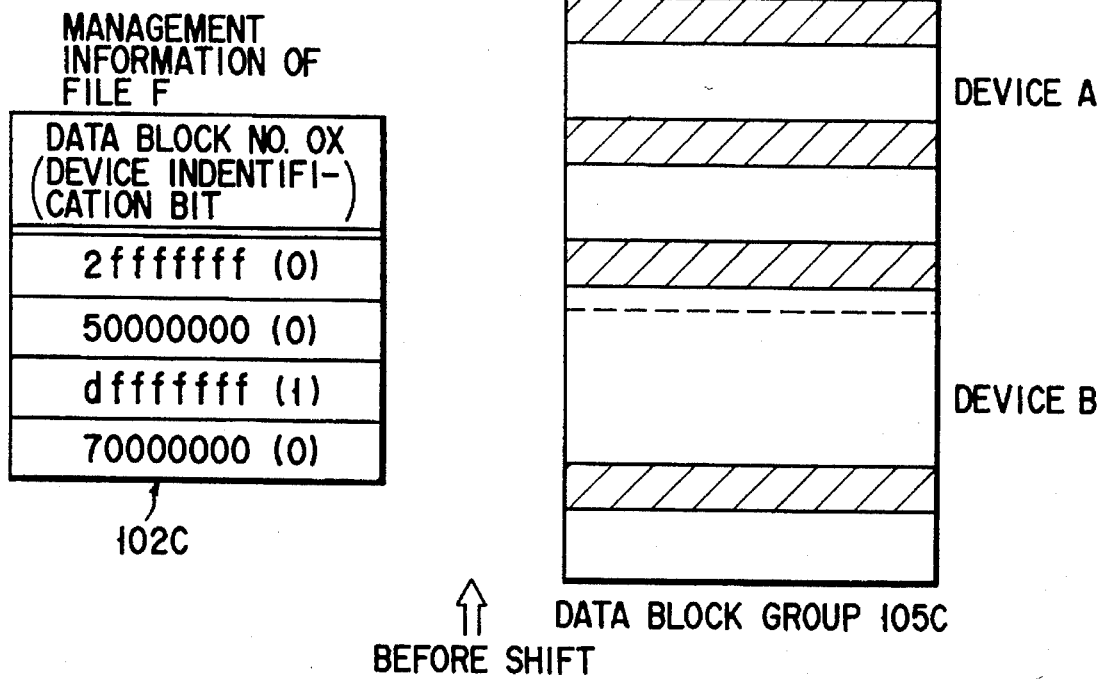
F I G. 8A
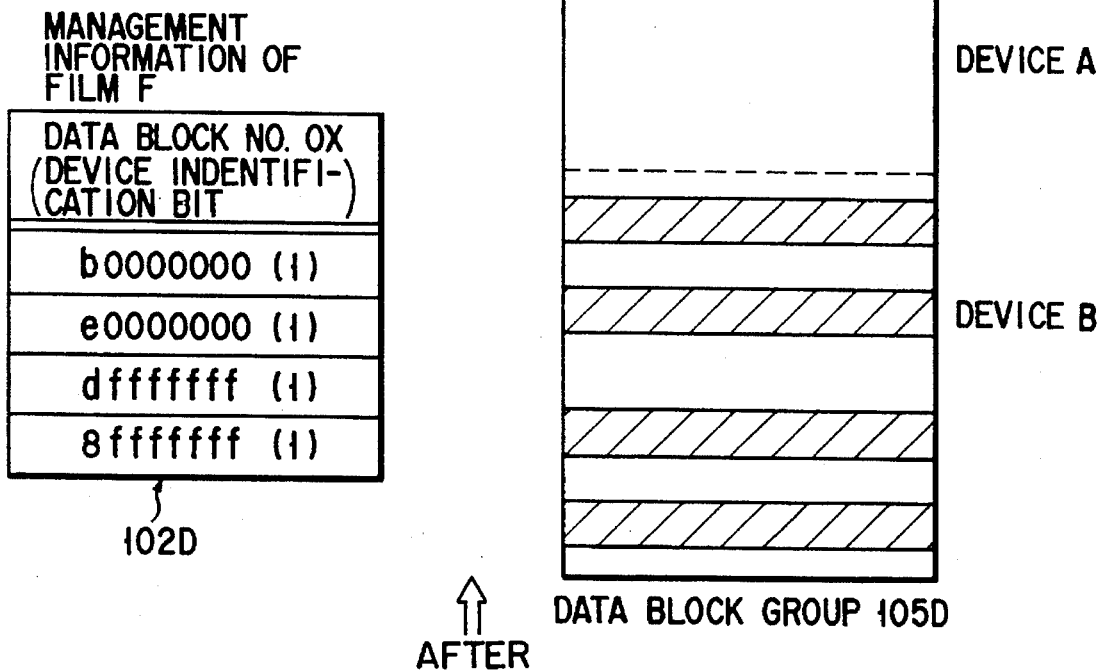
F I G. 8B

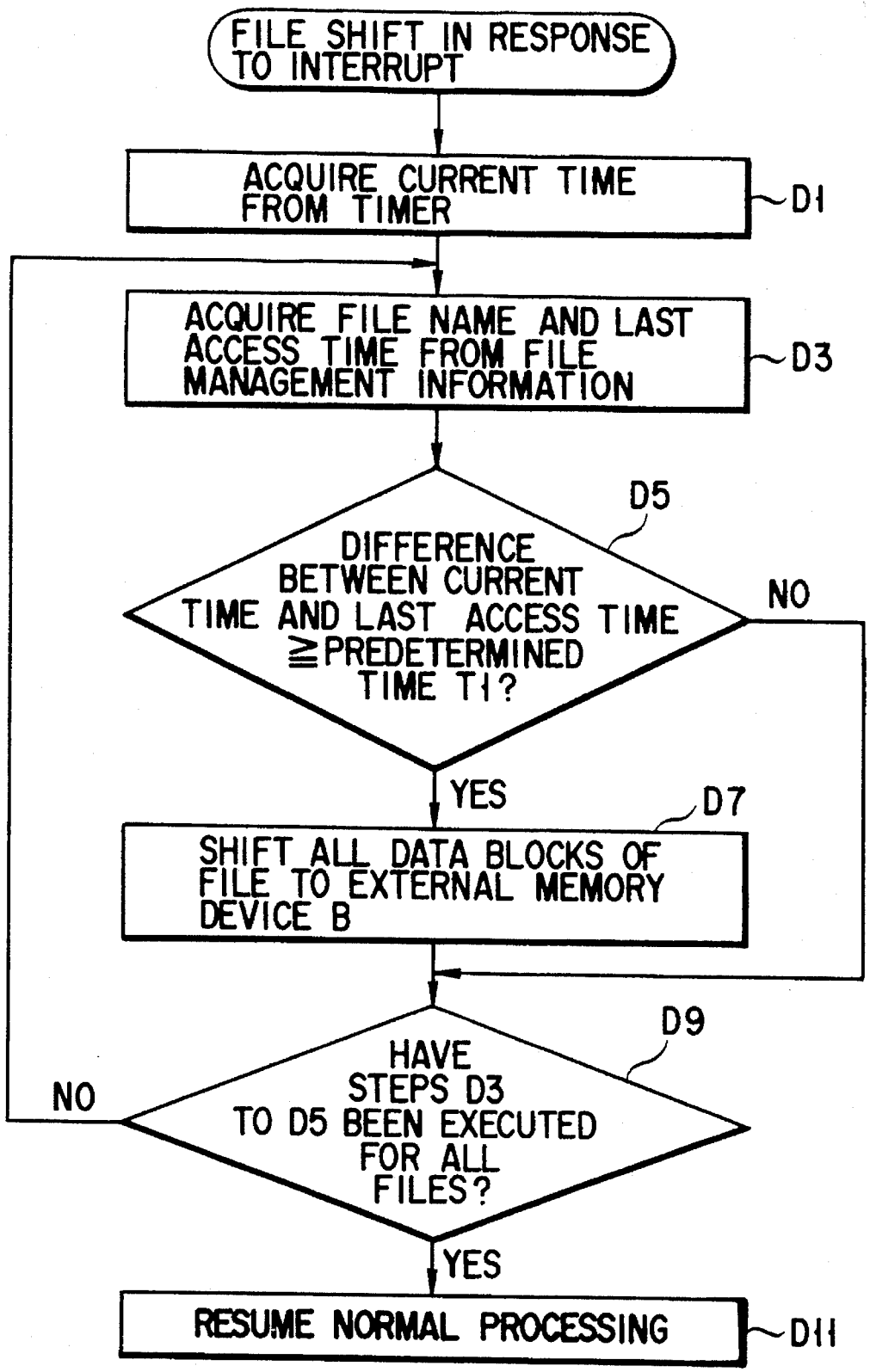
F I G. 11

FILE MANAGEMENT INFORMATION

| FILE NAME | DIFFERENCE TIME | LAST ACCESS TIME |
|---|---|---|
| F1 | 4.10 | 1993.9.30, 20:30 |
| F2 | 180.20 | 1993.8.04, 10:45 |
| ⋮ | ⋮ | ⋮ |

~102F

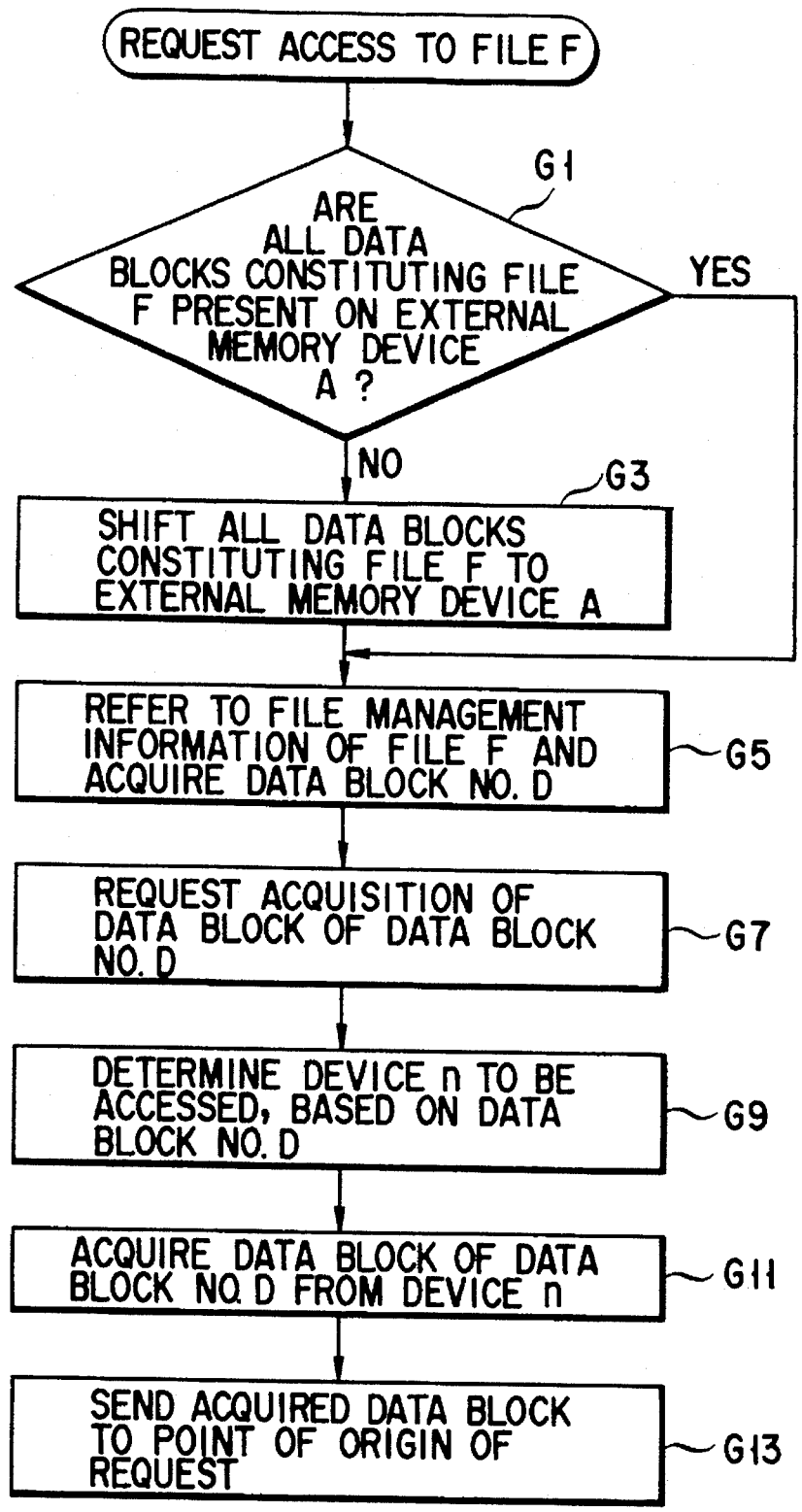
F I G. 15

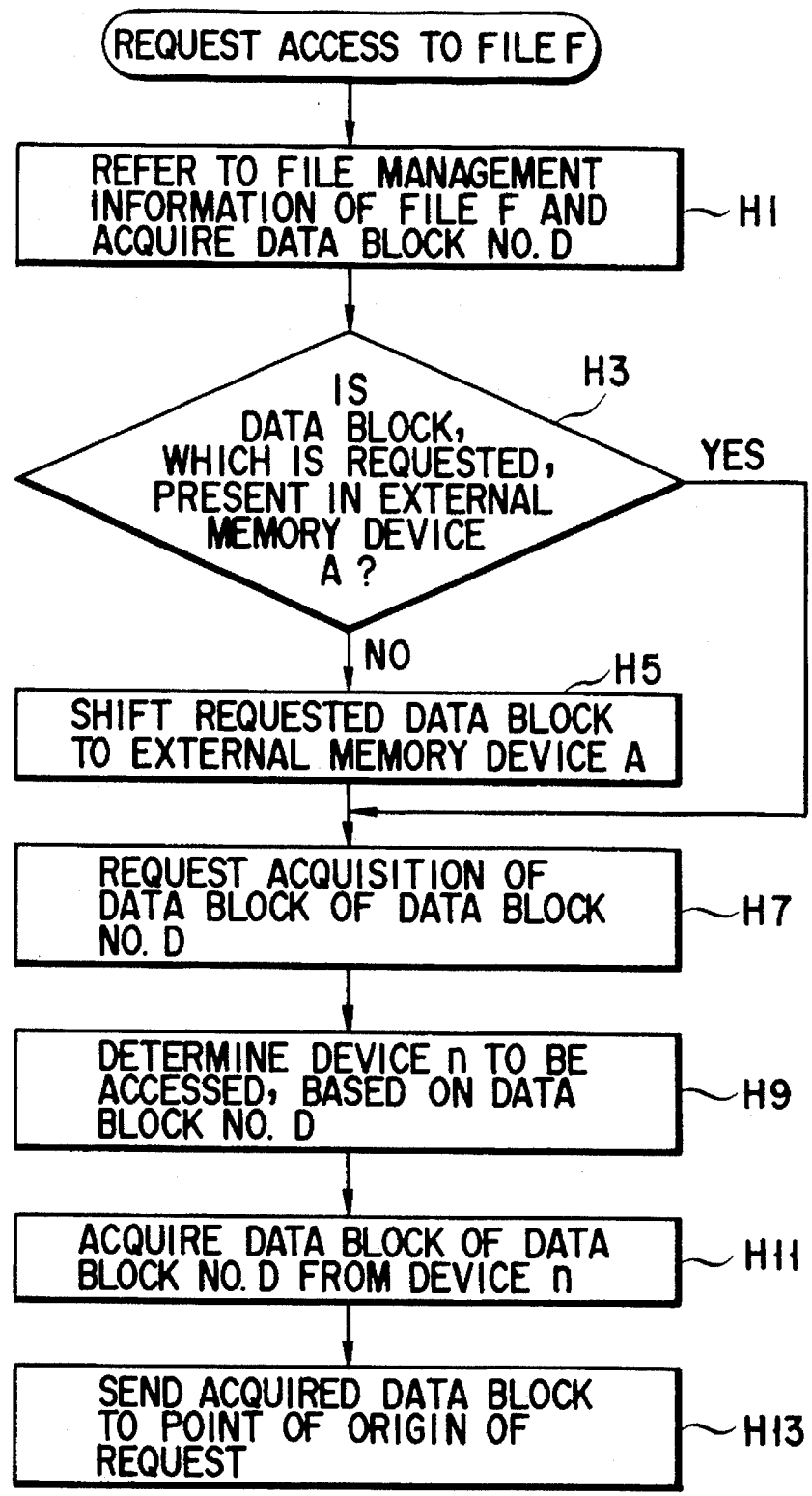
F I G. 16

FILE MANAGEMENT SYSTEM AND
METHOD FOR MANAGING ACCESS AND
STORAGE OF DATA WITHIN MULTIPLE
EXTERNAL MEMORY DEVICES

BACKGROUND OF THE INVENTION

1. Field of the Invention

The present invention relates to a file management system and method for managing, in a centralized manner, two or more types of external memory devices for storing files, where the file management is in an electronic computer system connected to two or more types of external memory devices such as storage mediums, storage systems, etc.

2. Description of the Related Art

Conventionally, to improve functionality or to provide access to a greater quantity of data, a computer system may be connected to two or more types of external memory devices (e.g. a magnetic disk, a magneto-optic, a static memory, etc.) having different storage mediums, storage methods, access speeds, capacities, etc. In such a computer system, logical data blocks for managing files are stored in the respective external memory devices.

Since data blocks are provided in the respective external memory devices, the data blocks are not transmitted between the external memory devices. Thus, the external memory devices are individually controlled by the computer system.

As has been described above, in the computer system having two or more types of external memory devices, it is necessary to manage the data blocks in the external memory devices independently, complicating the processing required managing files.

Normally, a file comprises data blocks. Files are stored in a memory region of an external memory device in units of data blocks. When file management is performed in a data block unit of the file, processing can be executed only in the external memory device storing the file. It is not possible to perform flexible processing in a data block unit, which covers all connected external memory devices.

In addition, when all files stored in the external memory devices are totally managed, it is necessary to access all the connected external memory devices, read out file management information stored in the external memory devices, and carry out processing using a plurality of file management information units.

SUMMARY OF THE INVENTION

An object of the present invention is to provide a system and a method for handling data blocks of two or more types of external memory devices in a centralized manner, in a computer system connected to the external memory devices.

Another object of the invention is to provide a system and a method for handling the data blocks in the computer system in a centralized manner, thereby performing flexible management of files and data blocks.

In order to achieve the objects, according to a first aspect of the invention, there is provided a computer system having a computer body and at least two types of external memory devices connected to the computer body. The computer system manages files stored in the plural external memory devices. The computer system includes a management device for assigning unified data block identifiers to a data block group of the plural external memory devices, and for managing the data block group; memory, provided uniquely to a file stored in the data block group, for storing the data block identifiers corresponding to the data blocks which constitute the file; an access device for acquiring, in response to a file access request, the data block identifier corresponding to the file access request by referring to the memory, and for acquiring the contents of the data block indicated by the data block identifier by using the management device.

As regards the first aspect, the system further includes a shifter for shifting, the contents of the data block from the external memory device of a shift source to the external memory device of a shift destination using the management device in response to a request for a data block shift between plural external memory devices, and for changing the data block identifier in the memory means corresponding to the data block of the shift source to the data block identifier corresponding to the data block of the shift destination.

According to a second aspect of the invention, there is provided a computer system having at least two types of external memory devices, comprising: file management information, provided uniquely to a file held in the at least two types of external memory devices, for indicating data blocks constituting the file by data block identifiers assigned to a data block group of the at least two types of external memory devices in a unified manner; and a management device for performing file management by operating the data block identifiers of the file management information.

As regards the second aspect, the system further comprises a shifter for shifting the contents of the data blocks of the external memory devices to other data blocks, the management device including a controller for shifting the file in units of a data block by using the shift means.

According to a third aspect of the invention, there is provided a method of managing files stored in at least two types of external memory devices in a computer system having a computer body and at least two types of external memory devices connected to the computer body. The method includes the steps of: a) assigning unified data block identifiers to a data block group of at least two types of external memory devices; b) storing the data block identifiers corresponding to the data blocks, which constitute the file held in the external memory devices, uniquely to a file; c) acquiring, in response to a file access request, the data block identifier corresponding to the file access request by referring to the data block identifiers stored in step (b); and d) acquiring the contents of the data block on the basis of the data block identifier acquired in step (c).

As regards the third aspect, the method further comprises e) shifting, in response to a request for data block shift between the plural external memory devices, the contents of the data block from the external memory device of a shift source to the external memory device of a shift destination; and f) changing the stored data block identifier corresponding to the data block of the shift source in step (e) to the data block identifier corresponding to the data block of the shift destination.

With the above structures and methods, in the computer system connected to plural types of external memory devices, the data blocks of the external memory devices can be treated in a unified manner. Thereby, flexible and effective file/data block management can be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows the structure of file management information for managing files and a data block group in the first embodiment;

FIGS. 8A and 8B show the states of the file management information and data block group before and after the shift of the data block between external memory devices in the first embodiment;

FIG. 11 is a flow chart illustrating the shift of a file between external memory devices in the second embodiment;

FIG. 15 is a flow chart illustrating a file access operation in a fourth embodiment of the invention; and FIG. 16 is a flow chart illustrating a file access operation in a fifth embodiment of the invention.

DETAILED DESCRIPTION OF THE PREFERRED EMBODIMENTS

Embodiments of the present invention will now be described with reference to the accompanying drawings.

Figure 1:
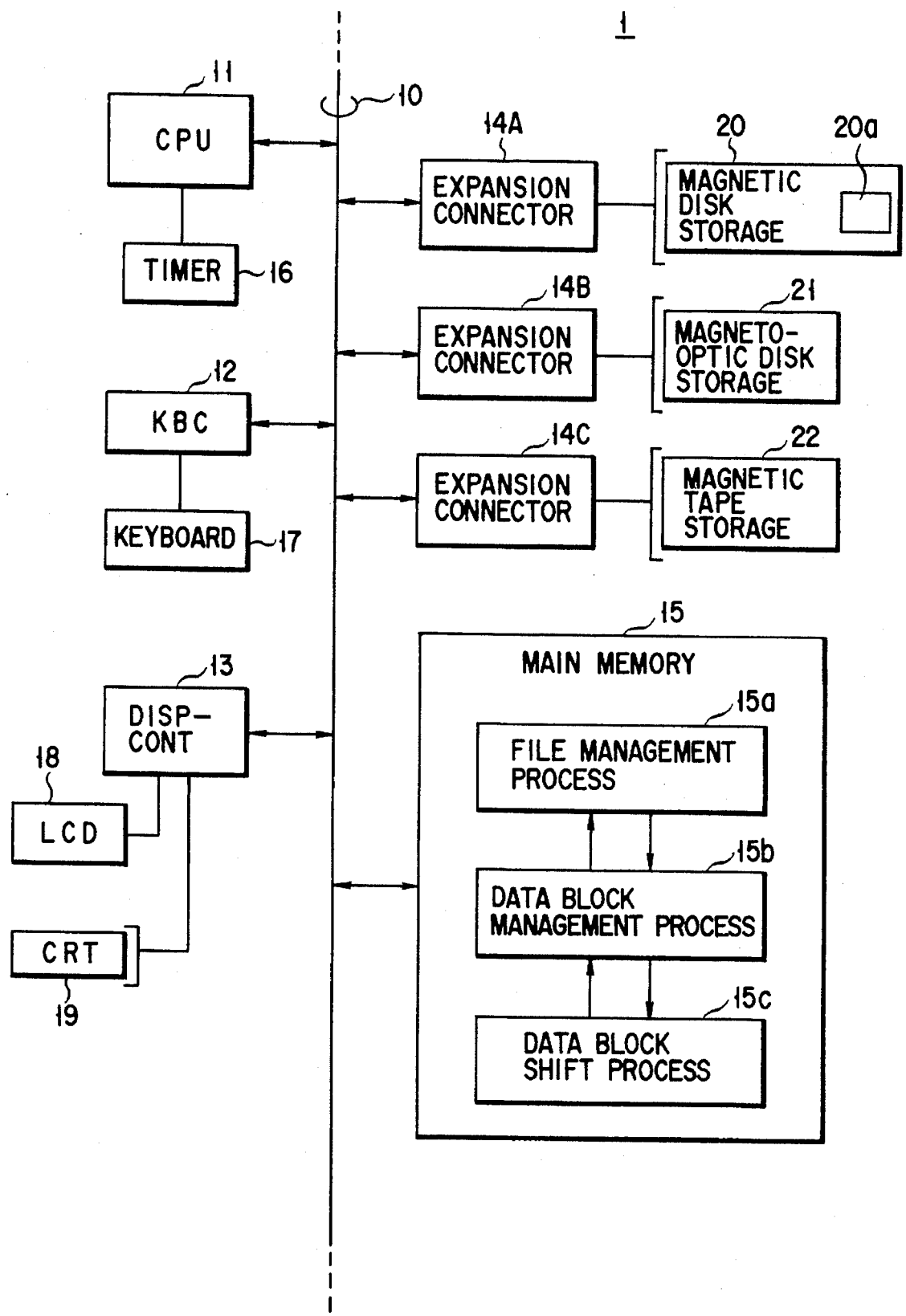
FIG. 1 shows the structure of a computer system to which a first embodiment of the file management system and method of the present invention has been applied.

FIG. 1 shows the structure of a computer system 1 to which a first embodiment of the present invention has been applied. In the computer system 1, a CPU (Central Processing Unit) 11, a KBC (keyboard controller) 12, a DISP-CONT (display controller) 13, expansion connectors 14A to 14C, and a main memory 15 are connected to a system bus 10. Data is transmitted between the components via the system bus 10.

The CPU 11 is connected to the system bus 10. A timer 16 is connected to the CPU 11. The CPU 11 controls the entire computer system 1 and processes various data. The timer 16 "tells" the CPU 11 the current time or the passage of a predetermined time by an interruption.

A keyboard 17 is connected to the KBC 12. The KBC 12 converts a command input by an operator via the keyboard 17 to predetermined data and outputs the converted data to the system bus 10.

An LCD (Liquid Crystal Display) 18 is connected to the DISP-CONT 13 as display device. The DISP-CONT 13 controls the LCD 18 on the basis of data received via the system bus 10. A CRT (Cathode-Ray Tube) display may be connected to the DISP-CONT 13, if necessary.

A magnetic disk device 20 is connected to the expansion connector 14A as first external memory device. The magnetic disk device 20 stores data blocks constituting a file. The magnetic disk memory device 20 is provided with file management information 20a (described later). A magneto-optic disk device 21 is connected to the expansion connector 14B as second external memory device. A magnetic tape device 22 is connected to the expansion connector 14C as third external memory device. The file management information 20a may be stored in any of the memory regions. In this embodiment, the file management information 20a is stored in that external memory device which can be accessed by the CPU 11 with a shortest time. If necessary, the file management information may be stored in a backed-up memory regions of the main memory.

The CPU 11 can access files stored in the magnetic disk device 20, magneto-optic disk device 21 and magnetic tape device 22 via the expansion connectors 14A to 14C in units of a data block.

The main memory 15 stores various data and programs to be processed in the computer system 1. In addition, the main memory 15 stores various processes relating to file management of the present invention, i.e. file management process 15a, data block management process 15b and data block shift process 15c.

The file management process 15a or data block shift process 15c are called, and thereby the file management information 20a of the magnetic disk device 20 is referred to in accordance with a command input by the operator via the keyboard 17. When data block acquisition is requested by the operator in the computer system 1, the data block management process 15b is called by the file management process 15a or data block shift process 15c. Thus, the files stored in the external memory devices can be managed in units of a data block.

Figure 2:
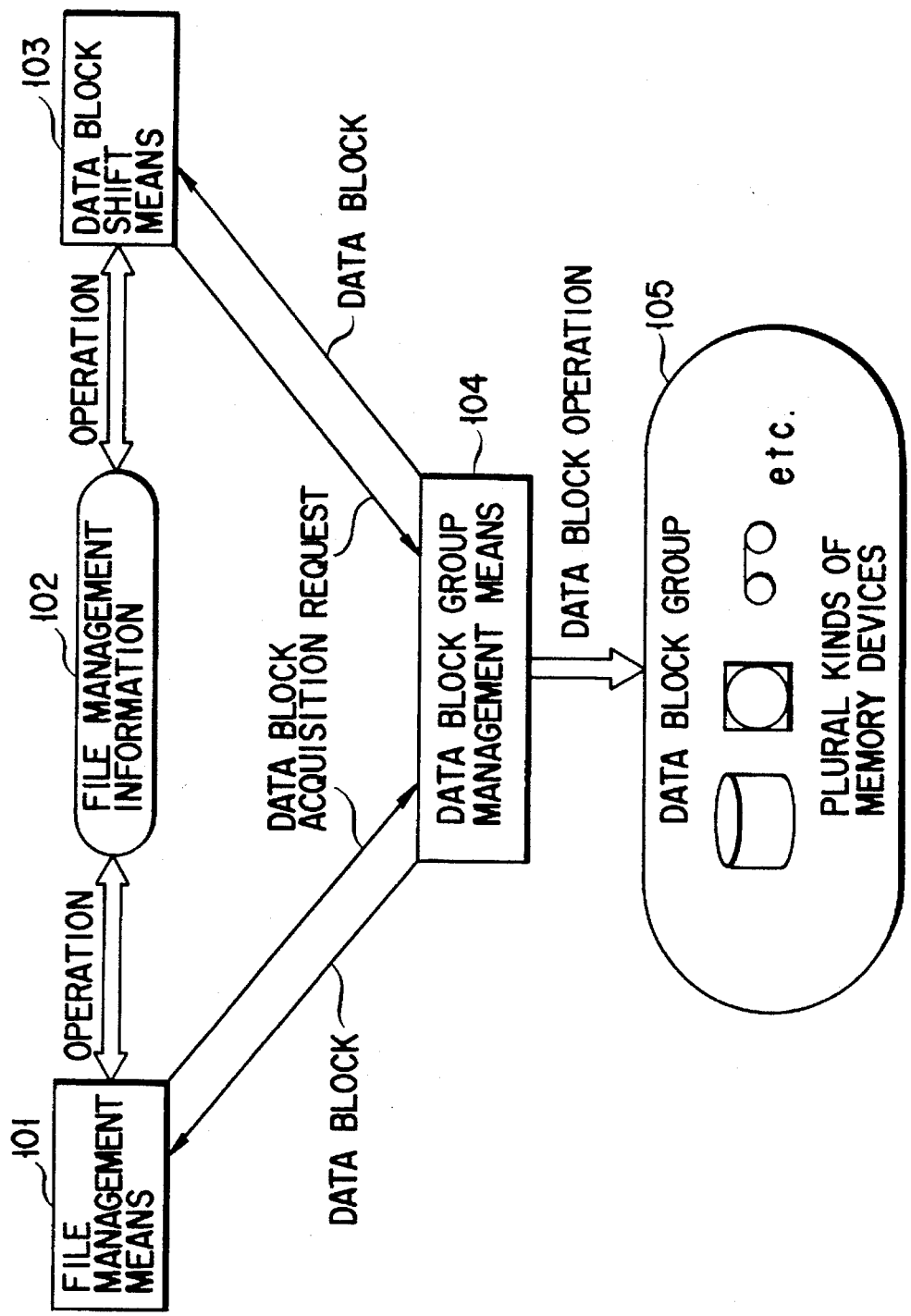
FIG. 2 is a block diagram illustrating the function of the first embodiment of the invention.

The operation and function of the first embodiment will now be described with reference to FIG. 2.

File management means 101 manages preparation, deletion, access, etc. of a file by referring to and operating file management information 102. Data block shift means 103 performs shift control of a data block, which is a constituent element of the file, by referring to and operating the file management information 102. Data block group management means 104 acquires a desired data block from a data block group 105 in response to a data block acquisition request from the file management means 101 or data block shift means 103. Data block group management means 104 supplies the received data block to a point of origin of request, i.e. the file management means 101 or data block shift means 103.

For example, when access to the data block of the file stored in the data block group 105 is requested, the file management means 101 refers to the management information of the designated file of the file management information 102. Thereby, the information relating to the data block constituting the file is acquired, and a request for data block acquisition is sent to the data block management means 104 on the basis of the acquired information.

The data block management means 104 acquires the requested data block from the data block group 105, and the acquired data block is supplied to the file management means 101. The file management means 101 supplies the data block to the point of origin of request. In this manner, the file access is processed.

Next, the structures of the file management information 102 and data block group 105 in the above embodiment will now be described with reference to FIGS. 3 and 4. As is shown in FIG. 3, the file management information stores, in a table format, data block numbers, which are assigned to the data blocks in such a way that the data block number can uniquely identify each data block in two or more external memory devices.

In the prior art, the table provided in the file management information 102A stores only the data block numbers assigned to the data blocks of files stored in a single external memory device. By contrast, in the present invention, the data block group 105 has a structure as shown in FIG. 3, and the file management information 102 stores the data block numbers assigned to the data blocks of the plural external memory devices in a unified manner.

Suppose that a file F comprises four data blocks with data block numbers "x", "y", "x+2" and "z" assigned. In a conventional system, the data block numbers "x", "y", "x+2" and "z" indicate data blocks within one of a plurality of external memory devices.

In the present invention, however, as shown in FIG. 3, data block numbers "x" and "x+2" indicate data blocks stored in an external memory device 0, data block number "y" indicates a data block stored in an external memory device 1, and data block number "z" indicates a data block stored in an external memory device n−1. In this way, one data file can contain data block numbers of data blocks stored in two or more external memory devices.

Figure 4:
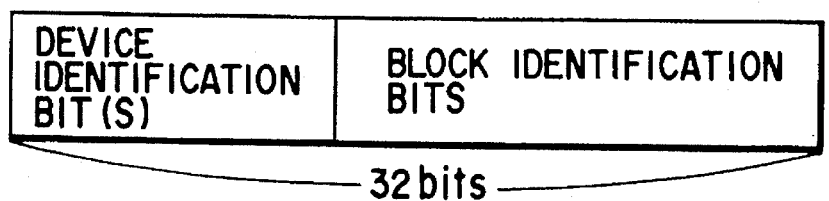
FIG. 4 shows the structure of a data block number shown in FIG. 3.

As is shown in FIG. 4, the data block number comprises an identification bit(s) of an external memory device and a block identification bits. Normally, the data block number comprises 32 bits.

For example, in a computer system connected to two external memory devices A and B (e.g. a magnetic disk device and a magneto-optic disk device), data block numbers "ox00000000" to "ox7fffffff" are assigned to data blocks of external memory device A, and data block numbers "ox80000000" to "oxffffffff" are assigned to data blocks of external memory device B. In this case, a first one bit of the data block number of the data block of the file functions as external memory device identification bit. If the first bit of the data block number is "0", it indicates the data block stored in the external memory device A. if the first bit of the data block number is "1", it indicates the data block stored in the external memory device B.

The above illustrates a data block number for two external memory devices where only one bit is assigned as external memory device identification bit. If three external memory devices need to be identified, two bits may be assigned as identification bits.

Figure 5:
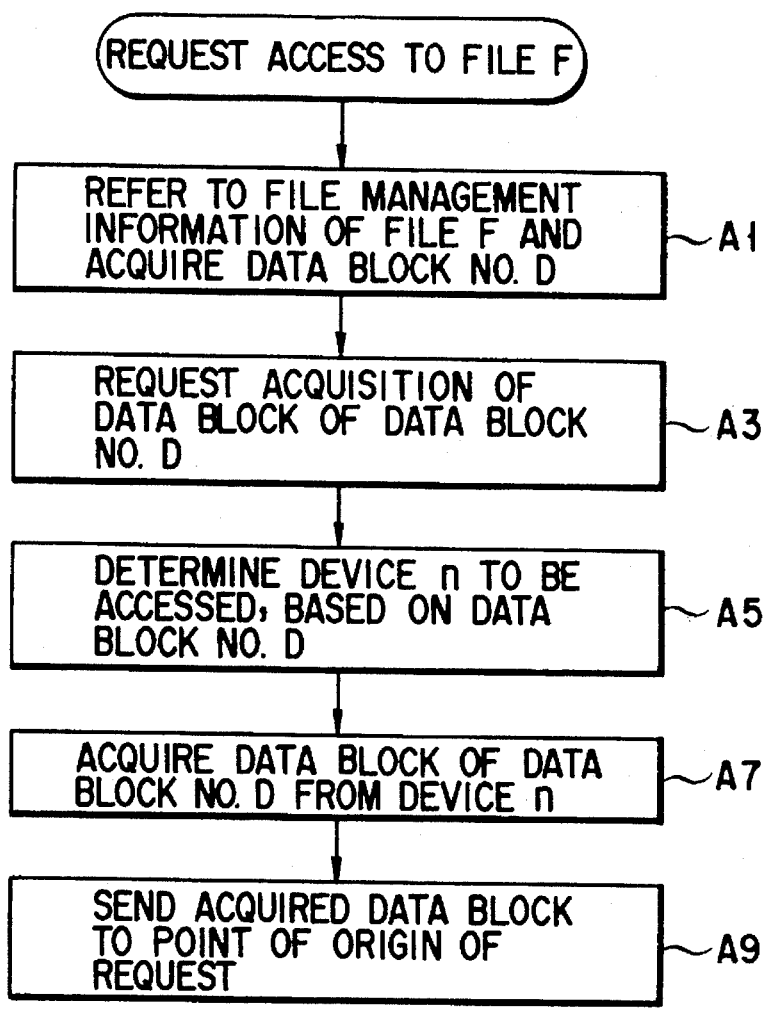
FIG. 5 is a flow chart illustrating a file access operation in the first embodiment.

Referring to the flow chart of FIG. 5, the operation in the file access mode will now be described.

When the file management means 101 has received a request for access to the file F from the operator, it refers to the management information of file F stored in the file management information 102 and acquires data block number "D" of the data block to be accessed from the data blocks constituting the file F (step A1).

Then, in order to acquire the data block corresponding to acquired data block number "D", a data block acquisition request is output to the data block group management means 104 (step A3).

The data block group management means 104 determines an external memory device n to be accessed, on the basis of the value of data block number "D" received from the file management means 101 (step A5). Further, the data block group management means 104 takes out the requested data block from the external memory device n within the data block group and sends this data block to the file management means 101 (step A7).

The file management means 101 receives the requested data block and sends it to the point of origin of request (step A9).

According to the above-described access operation, the file access is carried out when the data blocks of the two or more external memory devices are treated in a unified manner.

A description will now be given of the methods for preparing and deleting files in the memory region managed in the data block group 105 shown in FIG. 3.

In conventional file preparation means, since data blocks are managed separately according to individual external memory devices, preparation of a file is limited to the associated external memory device. In the present invention, however, since the data blocks of plural external memory devices are managed in a unified manner, a file can be prepared without the need to take into account the plural external memory devices. Accordingly, it is possible to prepare a file from data blocks stored separately in two or more external memory devices. In addition, it is possible to prepare file management information proper to the prepared file at the time of file preparation, and to manage the file using the file management information.

On the other hand, in file deletion means, the aforementioned file management information proper to the file may be used to delete the file stored in units of data blocks in plural external memory devices.

Figure 6:
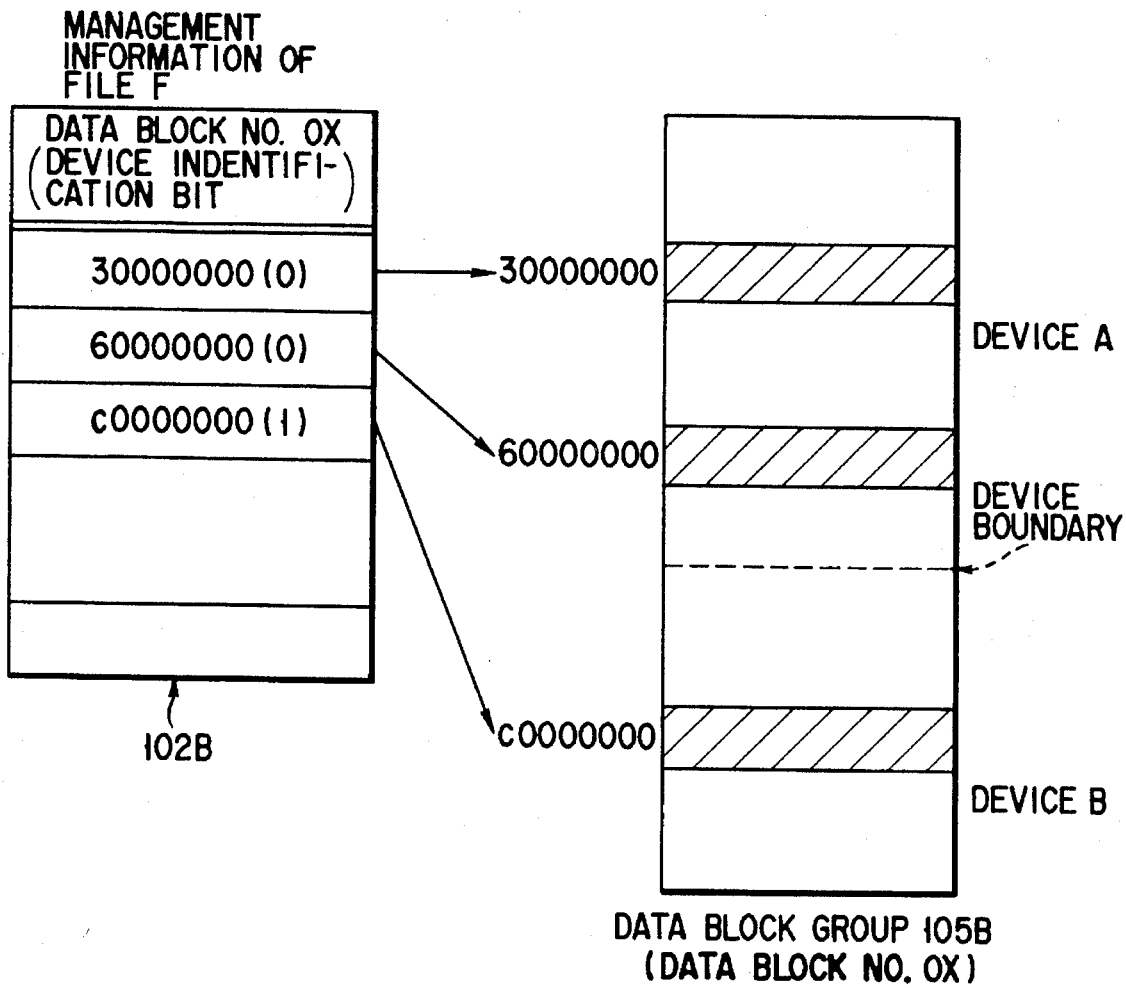
FIG. 6 shows an example of file management information and the state of a data block group when a file is prepared in the first embodiment.

For example, suppose that the data block group of external memory devices A and B (e.g. a magnetic disk and a magneto-optic disk) is managed in a unified manner. FIG. 6 shows the relationship between the file management information and the data block group when the file F has been prepared by the file management means 101 on the basis of data blocks stored separately in the external memory devices A and B.

There are two external memory devices A and B to be identified by the file management information 102B. Thus, which of the memory devices stores the data block is determined by the most significant bit. If the most significant bit of the data block number is "0", it indicates that the data block is stored in the external memory device A. If the most significant bit is "1", it indicates that the data block is stored in the memory device B.

According to the above file preparation means, it is possible to select the external memory device for preparing the data block of the file. For example, if no empty region is left in the external memory device A while a file is being prepared, an empty region in the external memory device B may be used instead. It is also possible to prepare a file having a size greater than the region of the memory device A or B.

Next, deletion of file F shown in FIG. 6 will now be described. The file F comprises data blocks corresponding to data block numbers stored in the management information 102B. At first, the file management means 101 refers to the file management information 102B and acquires data block numbers of data blocks to be deleted.

Then, based on the acquired data block numbers, the memory device relating to processing and the data blocks are determined, and each data block is deleted (invalidated). This processing is performed for all data blocks constituting the file F, and finally the file management information 102B is deleted.

According to the file preparation/deletion means of the present invention, preparation and deletion of a file associated with two or more external memory devices can be performed. Thereby, various flexible operations for files can be achieved. In addition, in preparing/deleting a file, there is no need to treat a plurality of file management information items. Since unified file management information can be used, the processing/memory efficiency is improved and the consistency of a file can easily be maintained.

Figure 7:
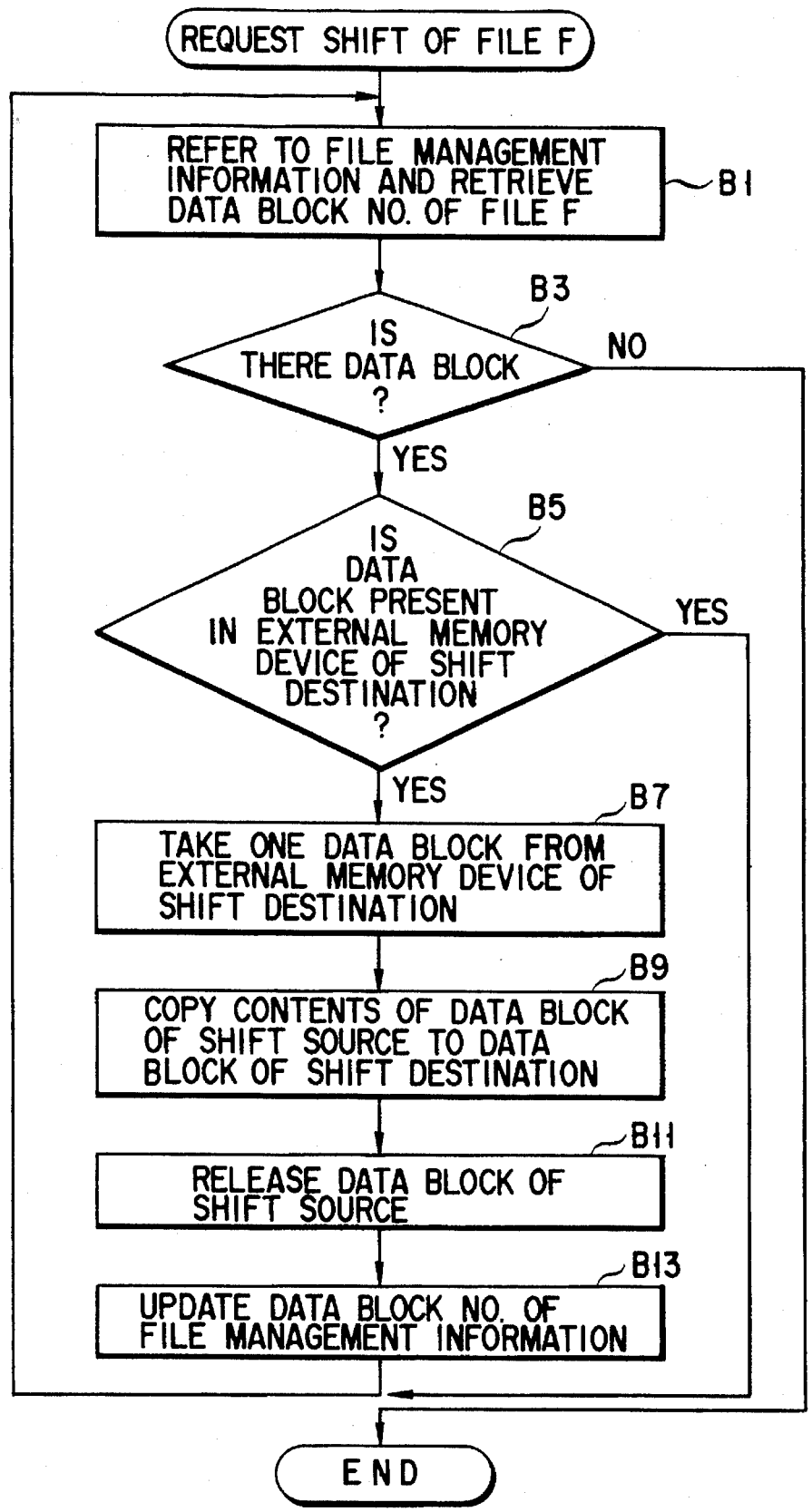
FIG. 7 is a flow chart illustrating a shift of a file between external memory devices in the first embodiment.

Handling of a file prepared in the data block group by the file preparation means will now be described. In particular, a process for shifting a file between plural devices will be described. FIG. 7 is a flow chart illustrating the file shift processing, and FIG. 8A shows examples of the management information 102C of file F and data block group 105C before the file shift.

The file F comprises plural data blocks. Thus, the shift of file F is effected by carrying out the shift processing of a data block unit. In the data block shift processing, when the data block shift means 103 has received a request for shift of file F, it refers to the file management information 102C and retrieves data block numbers of data blocks constituting the file F (step B1). If one of the data block numbers have been detected in step B1 ("YES" in step B3), the data block shift means 103 determines whether the data block indicated by the detected data block number is present in an external memory device of the shift destination (step B5).

If it is determined in step B5 that the data block is present in the external memory device of the shift destination ("YES" in step B5), the control routine returns to step B1 so that the data block shift means 103 may retrieve another data block number in the management information 102C of file F.

If it is determined in step B5 that the data block indicated by the detected data block number is not present in the shift-destination external memory device ("NO" in step B5), the data block shift means 103 keeps one empty data block in the shift-destination memory device (step B7). Then, the data block shift means 103 copies the contents of the data block of the shift source to the destination data block, by making use of the data block group management means 104 (step B9).

After the processing in step B9, the data block shift means 103 releases the data block of the shift source (step B11) and updates the block data number of the file management information 102C of file F (step B13). The processing from step B1 to step B13 is executed for all data blocks constituting the file F.

FIG. 8A shows file management information 102C of file F and a data block group 105C, and FIG. 8B shows file management information 102D of file F and data block group 105D after execution of shift processing of the file F shown in FIG. 8A from external memory device A to external memory device B. As is shown in FIGS. 8A and 8B, the shift of a desired file between external memory devices is effected by shifting data blocks in the data block group 105C, 105D, which is managed in a unified manner, by referring to the management information 102C of file F. Thus, the file shift between external memory devices can easily be performed. In addition, there is no need to perform preparation of file management information for each external memory device, deletion of unnecessary file management information, updating of a plurality of file management information items, etc. According to the present invention, various processing for file management can be performed only by updating a table showing data block numbers of only one unified file management information item. Thereby, the processing is facilitated.

The concept of a conventional "archival file system" employed to effectively utilize two or more types of external memory devices. According to the archival file system, as regards plural external memory devices, expensive ones capable of high-speed operations (e.g. magnetic disk, etc.) are set at a high level, and inexpensive ones with low-speed operations (magneto-optic disk, magnetic tape, etc.) are set at a low level. These devices are managed in a hierarchical manner. Normally, recently accessed files are stored in the external memory devices of the upper level, and files which have not recently been accessed are stored in the devices of the low level. Among the files stored in the devices of the high level, files which have not recently been accessed are shifted to the external memory devices of the low level and managed therein. In this manner, the computer system can be used with access performance and memory costs well balanced.

However, in the conventional computer system adopting the archival file system, when a file is shifted between the external memory devices, it is necessary to access file management information of each memory device, and processing operations become complex. Furthermore, a memory for storing file management information for each memory device is required.

Some examples in which the present invention has been applied to the archival file system will now be described. Suppose that external memory device A (magnetic disk device) is used as high-level external memory device, and external memory device B (magneto-optic disk device) is used as low-level external memory device.

Figures 9, 10:
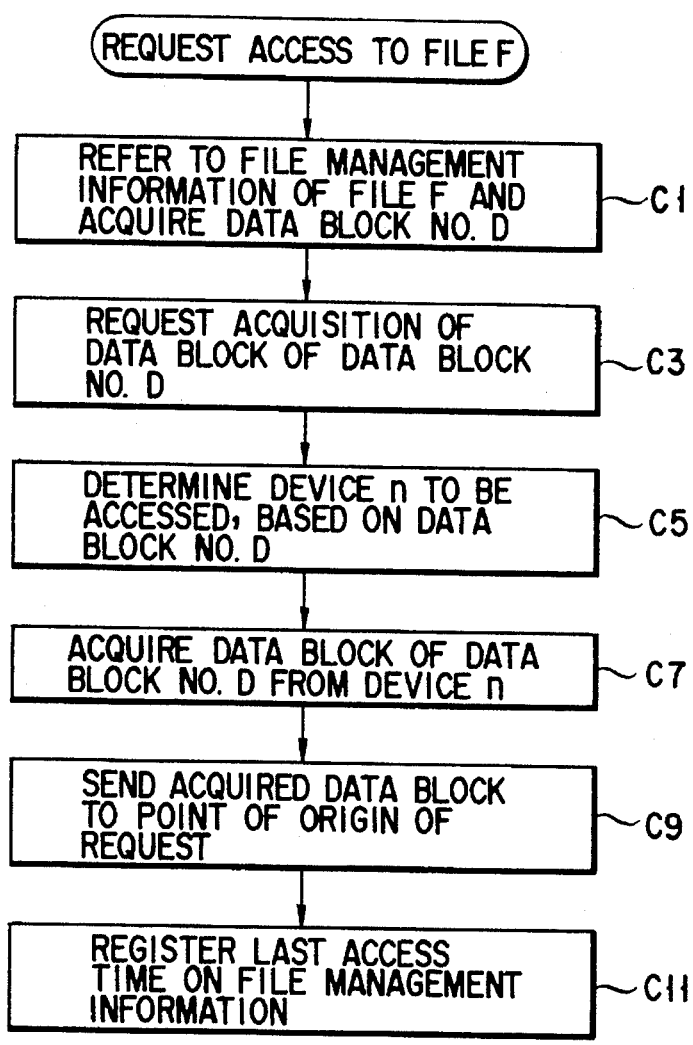
FIG. 9 shows part of the file management information in a second embodiment of the invention.
FIG. 10 is a flow chart illustrating the file access operation in the second embodiment of the invention.

A second embodiment of the invention, as devised under the above condition, will now be described. FIG. 9 shows a table 102E stored in file management information relating to the second embodiment. The file management information stores a table storing data block numbers, as described with reference to FIG. 3, as well as file names and last access time (date and time) of files in a table format.

In order to record the last access time in the table 102E, the processing as illustrated in the flow chart of FIG. 10 is executed, e.g. at the time of accessing to file F. Steps C1 to C9 in FIG. 10 correspond to steps A1 to A9 in FIG. 5, and a description thereof is omitted. Through the processing of steps C1 to C9, a data block, access to which has been requested, is acquired among data blocks constituting the file F, and the acquired data block is sent to the point of origin of request. Thereafter, in step C11, the file management means 101 acquires a current time from the timer in the computer system and records or updates the last access time in the table 102E.

By the access operation of the file management means 101, the data block of the file, access to which has been requested, is acquired, and the last access time of the file management information is recorded or updated.

Referring to FIG. 11, a file shift operation in response to a timer interrupt according to the second embodiment of the invention will now be described. In the file shift flow chart of FIG. 11, the respective steps are executed in response to an interrupt at every predetermined time set by the timer in the computer system to which the second embodiment is applied. The interrupt by the timer occurs, e.g. at every several hours.

In response to the interrupt by the timer, the data block shift means 103 acquires the current time from the timer (step D1). Then, a set of data is acquired from the table 102E of file management information which stores the file names and last access time (step D3). The last access time acquired in step D3 is subtracted from the current time acquired in step D1, and it is determined whether the subtraction result is not less than a predetermined time T1 (step D5).

In step D5, if the subtraction result is not less than the predetermined time T1 ("YES" in step D5), the data block shift means 103 shifts all data blocks of the associated file to the external memory device B (step D7). The data block shift (file shift) is executed on the basis of the file shift processing described with reference to FIG. 7.

After step D7 or if "NO" in step D5, the data block shift means 103 determines whether steps D3 and D5 have been executed for all files registered in the table 102E (step D9). If there is a file which has not been subjected to steps D3 and D5 ("NO" in step D9), the data block shift means 103 executes step D3 once again.

If "YES" in step D9, the timer interrupt processing is completed and the computer system is returned to the normal processing before the interrupt (step D11).

As has been described above, according to the second embodiment of the invention, the present invention can be applied to the archival file system. Thereby, the file shift between plural external memory devices can be achieved by using only one file management information item, while the access performance and memory costs is well balanced.

Figures 12, 13:
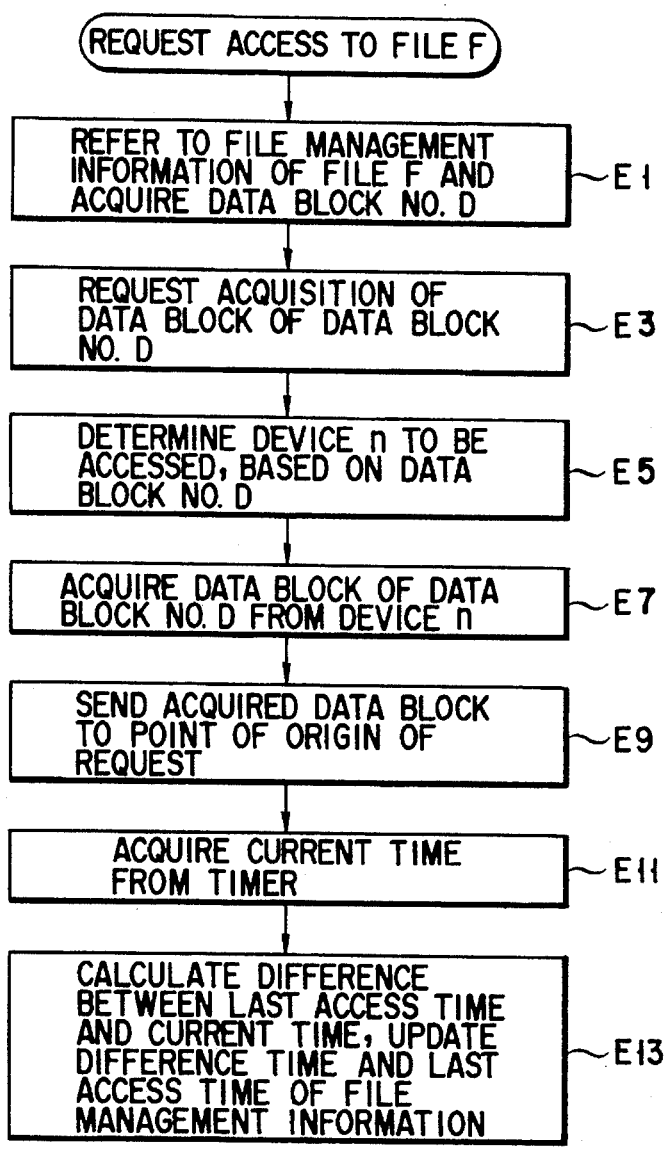
FIG. 12 shows part of the file management information in a third embodiment of the invention.
FIG. 13 is a flow chart illustrating a file access operation in the third embodiment.

A third embodiment of the invention, which is devised under the condition for the second embodiment, will now be described. FIG. 12 shows a table 102F stored in file management information according to the third embodiment. The file management information stores a table for storing data block numbers, as described with reference to FIG. 3, as well as the table shown in FIG. 12. The table 102F stores a difference time between the last access time and previous access time, in addition to the last access time registered on the table 102E described in connection with the second embodiment.

For example, when the file F is accessed, the processing as illustrated in the flow chart of FIG. 13 is executed to register the last access time and difference time on the table 102F. Steps E1 to E9 in FIG. 13 correspond to steps A1 to A9 in FIG. 5, and a description thereof is omitted. Through the steps E1 to E9, a data block, to which access is requested, is acquired among data blocks of file F. Thereafter, the file management means 101 acquires the current time from the timer in the computer system (step E11). In the subsequent step E13, the last access time registered in connection with the file F is subtracted from the current time acquired in step E11, and a difference time is calculated. The file management means 101 registers the difference time on the table 102F, and updates the last access time to the current time acquired from the timer.

By the access operation of the file management means 101, the data block of the file, access to which has been requested, is acquired, and the difference time and last access time of the file management information are registered or updated.

Figure 14:
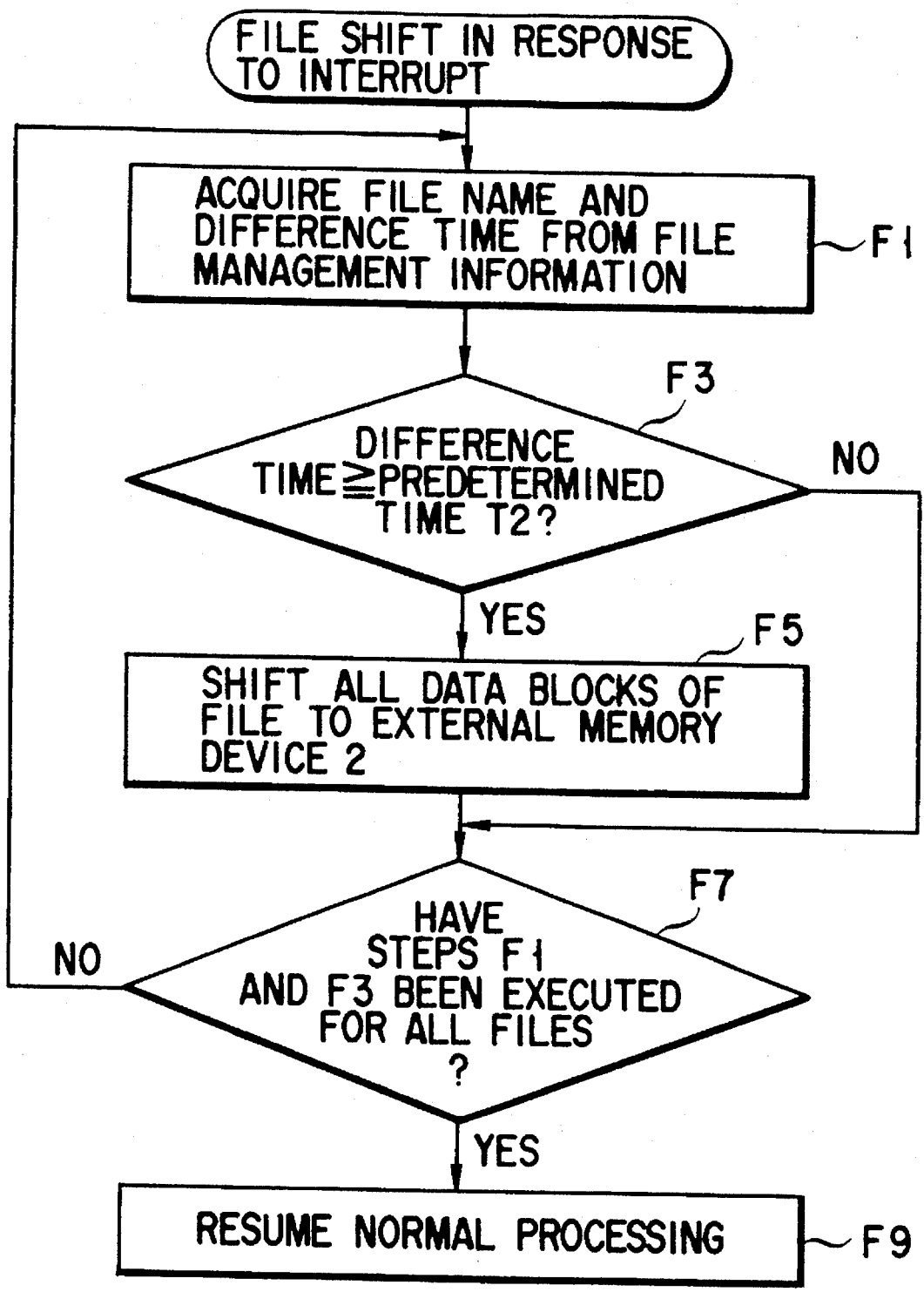
FIG. 14 is a flow chart illustrating the shift of a file between external memory devices in the third embodiment.

Referring to FIG. 14, a file shift operation in response to a timer interrupt according to the third embodiment of the invention will now be described. In the file shift flow chart of FIG. 14, the respective steps are executed in response to an interrupt at every predetermined time set by the timer in the computer system to which the third embodiment is applied. The interrupt by the timer occurs, e.g. at every several hours.

In response to the timer interrupt, the data block shift means 103 acquires a set of file names and difference times associated with the files from the table 102F of the file management information (step F1). Then, it is determined whether the difference time is not less than a predetermined time T2 (step F3).

In step F3, if the difference time is not less than the predetermined time T2 ("YES" in step F3), the data block shift means 103 shifts all data blocks of the associated file to the external memory device B (step F5). The data block shift (file shift) is executed on the basis of the file shift processing described with reference to FIG. 7.

After step F5 or if "NO" in step F3, the data block shift means 103 determines whether steps F1 and F5 have been executed for all files registered in the table 102E (step F7). If there is a file which has not been subjected to steps F1 and F5 ("NO" in step F7), the data block shift means 103 executes step F1 once again.

If "YES" in step F7, the timer interrupt processing is completed and the computer system is returned to the normal processing before the interrupt (step F9).

The above-described processing is based on the tendency: there is a low possibility that as regards files with long file access intervals, a lately accessed file is accessed shortly once again.

As has been described above, according to the third embodiment of the invention, the present invention can be applied to the archival file system. Thereby, the file shift between plural external memory devices can be achieved by using only one file management information item, while the access performance and memory costs is well balanced.

In the second and third embodiments, the file shift is executed in response to the interrupt by the timer of the computer system. However, the file management (shift) processing illustrated in FIGS. 11 and 14 may be executed, e.g. when the memory region of the external memory device is about to be filled. In this case, it is necessary to provide means for detecting the nearly full state of the memory region of the external memory device.

A fourth embodiment of the invention will now be described with reference to the flow chart of FIG. 15. In particular, this embodiment is directed to the process for shifting the entire file when an access to the file is requested. Under the same condition as the second embodiment, external memory device A (magnetic disk device) is used as high-level external memory device, and external memory device B (magneto-optic disk device) is used as low-level external memory device.

When the file management means 101 has received a request for access to the file F, it refers to the file management information 102 and determines whether all data blocks constituting the file F are present in the external memory device A (step G1). If any one of the data blocks of the file F is stored in the external memory device B ("NO"

in step G1), the data file management means 101 calls the data block shift means 103. The data block shift means 103 executes the processing for shifting all data blocks of the file F to the external memory device A (step G3). The data block shift is executed on the basis of the data block shift processing illustrated in the flow chart of FIG. 7. A description of the data block shift is, therefore, omitted.

If all data blocks of the file F has been shifted to the external memory device A by the processing in step G3 or if "YES" in step G1, the processing of step G5 and subsequent steps is performed. Thereby, the data block of the file, access to which has been requested, is acquired from the external memory device A and sent to the point of origin of request. Steps G3 to G13 correspond to steps A1 to A9 in FIG. 5, and therefore a description thereof is omitted.

If the above access processing is executed, all data blocks of the file F are shifted to and stored in the external memory device A. Thus, even if a request for access occurs to any of the subsequent data block of the file F, a quick response is achieved.

A fifth embodiment of the invention will now be described with reference to the flow chart of FIG. 16. In particular, this embodiment is directed to the processing for shifting only data blocks to be accessed to a high-speed accessible external memory device when file access is requested. In this embodiment, too, the aforementioned external memory devices A and B are used.

When the file management means 101 has received a request for access to the file F, it refers to the file management information 102 and acquires data block number "D" of the data block to be accessed (step H1). Based on the acquired data block number "D", the file management means 101 determines whether the data block, access to which has been requested, is stored in the external memory device A (step H3).

In step H3, if the data block, access to which has been accessed, is stored in the external memory device B ("NO" in step H3), the file management means 101 calls the data block shift means 103 and shifts the data block to be accessed to the external memory device A (step H5). The data block shift in step H5 is achieved by executing the processing of steps B9 to B13 in the flow chart of FIG. 7. Specifically, the data block shift means 102 copies the contents of the data block to be shifted to the external memory device A, and releases the data block of the external memory device B. Further, the data block number of the management information of the file F in the file management information is updated. Thus, if the data block to be accessed is stored in the external memory device B, it is shifted to the external memory device A.

If the data block to be accessed has been shifted to the external memory device A in step H5 or if "YES" in step H3, the acquired data block is sent to the point of origin of access request in the process of steps H7 to H13. Steps H7 to H13 correspond to steps A3 to A9 in FIG. 5, and therefore a description thereof is omitted.

Since the above access process is executed, the data block of file F to be accessed is shifted to and stored in the external memory device A. Thus, even if a request for access occurs to any of the subsequent data block, a quick response is achieved.

As is clear from the above-described first to fifth embodiments, according to the present invention, the data blocks stored in plural memory devices are managed in a unified manner as logical data block group, and thereby the data blocks stored in any one of external memory devices can be treated in a unified manner without logical distinction. Therefore, compared to conventional systems and methods, processing relating to external regions can easily be performed.

Furthermore, only one kind of file management information is provided for plural types of external memory devices, and management information items relating to files are set in a predetermined memory region. Therefore, the file management processing efficiency and the memory efficiency of memory devices can be enhanced, and consistency in file management can easily be maintained. In particular, this invention is effective in achieving an archival file system.

The aforementioned easy processing relating to external regions leads to simplification of software processing in computer systems. Accordingly, preparation of programs with use of computer systems becomes easier.

Moreover, since the file management information provided for each of plural external memory devices is unified, higher-speed access in file management (file preparation, file deletion, file shift) can be executed, as compared to the prior art.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system comprising:

at least two types of external memory devices, said external memory devices storing data blocks;

management means for assigning a unique data block identifier to the data blocks within said plural external memory devices, and for managing the data blocks;

memory means for storing the data block identifiers corresponding to the data blocks which constitute a file;

access means for acquiring, in response to a file access request, the data block identifier corresponding to the file access request by referring to the memory means, and for acquiring contents of the data block indicated by the data block identifier using the management means; and shift means for shifting, in response to a request for a data block shift between the plural external memory devices, contents of a data block from a source external memory device to a destination external memory device using the management means, and for changing a data block identifier in the memory means corresponding to the data block of the source external memory device to the data block identifier corresponding to the data block of the destination external memory device.

2. The system according to claim 1, wherein the memory means is provided in the external memory device that can be accessed most quickly.

3. The system according to claim 1, further including timer means for detecting passage of a predetermined time and a current time, wherein said memory means includes a memory region for storing a file name of a file held in the plural external memory devices and a last access time of the file, said access means acquires the current time by referring to the timer means when contents of the data block are acquired, and updates an access time in the memory region with the current time, and said shift means includes:
  determination means for acquiring the current time from the timer means in response to detection of the passage of predetermined time by the timer means, for calculating a difference time between the access time stored in the memory means and the current time, and for determining whether the difference time is greater than a predetermined time, with respect to each file held in the memory means; and
  shift means for shifting, to a predetermined one of the external memory devices, contents of all data blocks constituting the file with respect to which the determination means has determined that the calculated difference time is greater than the predetermined time.

4. The system according to claim 3, wherein said predetermined external memory device has a longest access time among the plural external memory devices.

5. The system according to claim 1, further comprising timer means for detecting passage of a predetermined time and a current time, wherein
  the memory means includes a memory region for storing a file name of a file held in the plural external memory devices, a last access time of the files, and a difference time between the last access time and a previous access time,
  the access means acquires the current time by referring to the timer means when data held in the data block is acquired in response to an access request, calculates a difference between the current time and a last access time of a file stored in the memory means for which access has been requested, updates the difference time of the access-requested file with the calculated difference, and updates the last access time with the current time, and
  the shift means includes:
    determination means for determining, in response to detection of the passage of predetermined time by the timer means, whether the difference time held in the memory means is greater than a predetermined time, with respect to each file registered in the memory means; and
    shift means for shifting, to a predetermined one of the external memory devices, contents of all data blocks constituting the file with respect to which the determination means has determined that the difference time held in the memory means is greater than predetermined time.

6. The system according to claim 5, wherein said predetermined external memory device has a longest access time among the plural external memory devices.

7. The system according to claim 1, wherein the access means includes:
  determination means for determining whether all data blocks constituting the access-requested file belong to a predetermined one of the external memory devices by referring to the memory means when an access request has been received; and
  shifting means for shifting contents of all data blocks constituting the access-requested file to the data block of the predetermined one of the external memory devices using the shift means, when the determination means has determined that at least one of the data blocks belongs to one of the external memory devices other than the predetermined one of the external memory devices.

8. The system according to claim 7, wherein the predetermined external memory device has a shortest access time among the plural external memory devices.

9. The system according to claim 1, wherein said access means includes:
  determination means for determining whether the data bock of the access-requested file belongs to a predetermined one of the external memory devices by referring to the memory means when an access request has been received;
  shifting means for shifting the contents of the data blocks to the data block of the predetermined one of the external memory devices using the shift means, when said determination means has determined that the data blocks do not belong to the predetermined one of the external memory devices.

10. The system according to claim 9, wherein said predetermined external memory device has a shortest access time among the plural external memory devices.

11. A computer system comprising:
  at least two types of external memory devices;
  memory for storing file management information, the file management information being unique to a file held in at least one of the external memory devices and indicating data blocks constituting the file data block identifiers assigned to a data block group of the external memory devices, the file management information being stored in a unified manner;
  copy means for copying contents of a source data block in one of the external memory devices to a destination data block in another of the external memory devices;
  management means for performing, in response to a move request for data block movement between the at least two types of external memory devices, data block movement using the copying means in accordance with the data block identifiers of the memory, and for changing the data block identifier for the source data block to a data block identifier for the destination data block.

12. The system according to claim 11, wherein the data block movement performed by the management means includes file access, file preparation and file deletion.

13. A method of managing files stored in at least two types of external memory devices in a computer system, comprising the steps of:
  a) assigning unified data block identifiers to data blocks within the external memory devices;
  b) storing the assigned data block identifiers corresponding to the data blocks that constitute a file held in at least one of the external memory devices, uniquely to the file;
  c) acquiring, in response to a file access request, the data block identifier corresponding to the file access request by referring to the data block identifiers stored in step (b);
  d) acquiring contents of the data block on the basis of the data block identifier acquired in step (c);
  e) shifting, in response to a request for a data block shift between the plural external memory devices, contents of a data block from a source external memory device to a destination external memory device; and
  f) changing a data block identifier for the data block of the source external memory device to the data block identifier for the data block of the destination external memory device.

14. The method according to claim 13, wherein step (b) includes a step of storing the data block identifiers, which are to be stored, in the external memory device that can be accessed most quickly.

15. The system according to claim 13, further including the steps of detecting the passage of a predetermined time and detecting a current time, wherein step (d) includes a step of acquiring the current time when contents of the data block are acquired, and for storing the current time as a last access time, and step (e) includes:

a determination step of acquiring the current time in response to detection of the passage of predetermined time, calculating a difference time between the access time stored in the step (d) and the current time, and determining whether the difference time is greater than a predetermined time, with respect to all files held in the external memory devices; and a shift step of shifting, to a predetermined one of the external memory devices, contents of all data blocks constituting the file with respect to which the calculated difference time is greater than the predetermined time.

16. The method according to claim 15, wherein the predetermined external memory device has a longest access time among the plural external memory devices.

17. The method according to claim 13, further including the steps of detecting the passage of a predetermined time and detecting a current time, wherein step (b) includes a step of storing a file name of a file held in the external memory devices, a last access time of the file, and a difference time between the last access time and a previous access time, step (d) includes a step of acquiring the current time when the contents of the data block are acquired in response to an access request, calculating a difference between the current time and a last access time of the file for which access has been requested, updating the difference time stored in step (b) with the calculated difference time, and updating the last access time with the current time, and step (e) includes:

a determination step of determining, in response to detection of the passage of predetermined time, whether the difference time stored in step (d) is greater than a predetermined time, with respect to all stored files; and a shift step of shifting, to a predetermined one of the external memory devices, contents of all data blocks constituting the file with respect to which the determination means has determined that the difference time stored in the step (d) is greater than the predetermined time.

18. The method according to claim 17, wherein the predetermined external memory device has a longest access time among the external memory devices.

19. The method according to claim 13, wherein step (c) includes:

a determination step of determining, when an access request has been received, whether all data blocks constituting the access-requested file belong to a predetermined one of the external memory devices by referring to the data block identifier stored in the step (b); and a shifting step of shifting, to the data block of the predetermined external memory device, the contents of all data blocks constituting the access-requested file by steps (e) and (f), when it is determined in the determination step that at least one of the data blocks belongs to one of the external memory devices other than the predetermined one of the external memory devices.

20. The method according to claim 19, wherein the predetermined external memory device has a shortest access time among the external memory devices.

21. The method according to claim 13, wherein the step (c) includes the steps of:

determining, when an access request has been received, whether the data blocks of the access-requested file belong to a predetermined one of the external memory devices by referring to the data block identifier stored in step (b); and shifting the contents of the data blocks to the data block of the predetermined external memory device after steps (e) and (f), when it is determined in the determination step that the data blocks do not belong to the predetermined one of the external memory devices.

22. A file management method in a computer system having at least two types of external memory devices, comprising the steps of:

storing file management information, which is unique to a file held in at least one of the external memory devices and which indicates data blocks constituting the file by data block identifiers assigned to a data block group of the external memory devices; the file management information being stored in a unified manner;

copying contents of a source data block in one of the external memory devices to a destination data block in another of the external memory device; and performing, in response to a move request for data block movement between the at least two types of external memory devices, data block movement in accordance with the data block identifiers of the memory, and changing the data block identifier for the source data block to a data block identifier for the destination data block.

23. The method according to claim 22, wherein the data block movement step includes steps of executing file access, file preparation and file deletion.

* * * * *